United States Patent [19]
Singh et al.

[11] 3,795,880
[45] Mar. 5, 1974

[54] PARTIAL PRODUCT ARRAY MULTIPLIER

[75] Inventors: Shanker Singh, Hyde Park; Ronald Waxman, Poughkeepsie, both of N.Y.

[73] Assignee: International Business Machines Corporation, Armonk, N.Y.

[22] Filed: June 19, 1972

[21] Appl. No.: 264,082

[52] U.S. Cl. .................... 235/164
[51] Int. Cl. .................... G06f 7/54
[58] Field of Search .................... 235/164

[56] References Cited

UNITED STATES PATENTS

| | | | |
|---|---|---|---|
| 3,691,359 | 9/1972 | Dell | 235/164 |
| 3,065,423 | 10/1962 | Peterson | 235/164 X |
| 3,670,956 | 6/1972 | Calhoun | 235/164 |
| 3,752,971 | 8/1973 | Calhoun et al. | 235/164 |

*Primary Examiner*—Malcolm A. Morrison
*Assistant Examiner*—David H. Malzahn
*Attorney, Agent, or Firm*—Kenneth R. Stevens

[57] ABSTRACT

A multiplier comprising a partial product array means for receiving an *m*-bit multiplier and an *n*-bit multiplicand for generating a partial product array of numbers in a plurality of columns. Each of the columns is connected to a multi-operand adder capable of simultaneously adding *m*-bits.

4 Claims, 9 Drawing Figures

PARTIAL PRODUCT ARRAY MULTIPLIER

BACKGROUND OF THE INVENTION

Computers are traditionally designed to add only two numbers at a time. Some efforts have been directed to partial product multipliers but in known instances, these schemes are limited to two or three rows. In the conventional sense, multiplication is accomplished as an iterative addition with variations in the method of developing the final product. These approaches require a minimum amount of hardware in that only one multiplier bit is manipulated at a time. In some instances, the product of the low-order multiplier bit is multiplied with the multiplicand and this result is added to a shifted product of the next higher order bit of the multiplier and the multiplicand. This result is stored and added again to the product of the third multiplier bit and the multiplicand, etc.

Some prior schemes attempted to increase to the multiplication speed by examining simultaneously two, three and sometimes four multiplier bits and manipulating these results with complex algorithms for shifting over zeros and for adding and subtracting appropriate amounts from the partial sums as the multiplication takes place. Multiplication speeds are also increased by examining multiple bits of the multiplier simultaneously with appropriate addition and subtracting during a multiply cycle accompanied by shifting over zeros or ones of the multiplier, since a zero bit requires the addition of zero to the partial sum.

Another conventional method of increasing multiplication speed is to provide prefabricated multiples of the multiplicand; thus, for a set number of multiplier bits, tables corresponding to multiples of the multiplicand are employed, and an appropriate result is then gated to an adder circuit.

In all of these instances, speed is obtained by increasing the level and sophistication of the hardware. Obviously, hardware complexity is greatly increased as multiplier systems attempt to examine more than three multiplier bits at a given time.

With the advent of large scale integration, it is now becoming technically feasible to modify the manner of addition and allow for the addition of multiple operands, many times in excess of three operands,

SUMMARY OF THE INVENTION

Therefore, it is an object of the present invention to provide a high-speed multiplier which allows for the simultaneous examination and manipulation of many multiplier bits.

Another object of the present invention is to provide a high-speed multiplier for performing an arithmetic multiplication with a more simplified and less costly hardware implementation.

Another object of the present invention is to provide a high-speed multiplier scheme which allows for a range of design variations as to computational time, hardware costs, and hardware complexity.

In accordance with the aforementioned objects, the present invention comprises a partial product array (PPA) means in combination with a multi-operand adder (MOA) for providing a high-speed multiplier.

The foregoing and other objects, features and advantages of the invention will be apparent from the following more particular description of the preferred embodiment of the invention as illustrated in the accompanying drawings.

DESCRIPTION OF THE PREFERRED EMBODIMENTS

Figure 1:
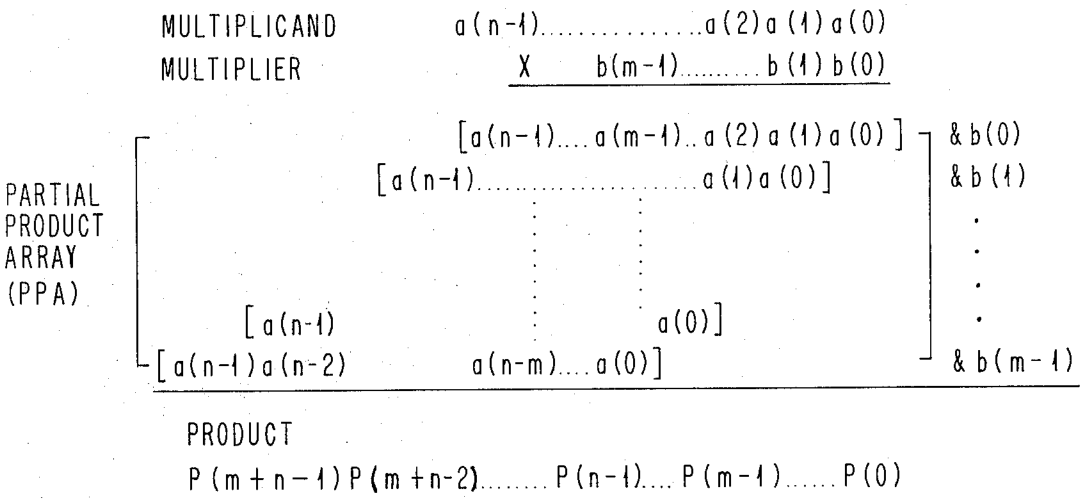
FIG. 1 is a chart illustrating the classical pencil-and-paper or long-hand process of performing multiplication.

In the present invention, a numerical partial product is generated in a partial product array (PPA). The partial product array receives an $m$-bit multiplier and an $n$-bit multiplicand. Each column of the partial product array is implemented by a register with $m$-bit positions. In the maximum hardware case, $m + n - 1$ register columns are necessary. In the intermediate hardware case, only $p$ register columns are necessary, where k is an interger which is greater than or equal to $\log_2 (m - 1)$. In this embodiment, $k - 1$ one bit shift operations are necessary.

In the embodiment requiring $m + n - 1$ registers, each column result is applied in parallel as inputs to an associated multi-operand adder. This embodiment requires maximum hardware. In the intermediate hardware case, each physical register column represents $k$ columns of the partial product array. Thus, in a first addition cycle, for the intermediate hardward case, each column of the partial product array is applied to the inputs of an associated multi-operand adder. The mathematical results are stored, and then the contents of the registers are shifted one position. The bit value of the $k^{th}$ position of each register is fed into the first position of each of the succeeding or higher order register columns. At the end of this shift cycle, each column is again applied as inputs to its associated multiple-operand adder. The results are stored and combined with the previous results and another shift cycle is initiated. In order to complete the multiplication $k-1$ shifts are required. The final product is obtained at the output of the multi-operand adder circuitry after a final carry-look-ahead addition which combines the results of the final multi-operand addition and the results of the previous multiply cycle.

In the present invention, with m representing the number of bits in the multiplier and n representing the number of bits in the multiplicand, the PPA comprises m rows and $m + n-1$ columns, where each row is shifted one bit to the left of the previous row in order to take into account the arithmetic weight of the multiplier bit corresponding to its associated row.

A partial product is simultaneously generated in the PPA. Since the value of each bit position of a binary number is either 0 or 1, the product of a 0 or 1 times the multiplicand will either be a 0 or the binary value of the multiplicand itself. Thus, the partial product array is capable of being simultaneously filled by allowing a register position in each predetermined skewed row to be altered for each bit of the multiplicand. Additionally, an input is applied to the appropriate register position of each row corresponding to the multiplicand bits. The output of each register position may then be logically combined, for example, by an AND operation, with the appropriate multiplier bit in order to yield the true value of that particular bit by bit multiplication. The true values obtained in each column are then simultaneously applied to a multi-operand adder in order to yield the results of the multiplication operation. Accordingly, the present invention requires that (1) the multiplier and multiplicands be selectively stored; and (2) the partial product array be simultaneously formed by applying the multiplicand bits into appropriate partial product array register positions; as logically determined by the multiplier bits; and (3) the outputs of the partial product array be combined in a multi-operand adder.

If the PPA is implemented so as to allow it to physically handle fewer bits than the number of bits in the multiplier, the multiplication process in the partial product array must be repeated for each group of the partitioned multiplier.

As will be described in greater detail with one particular embodiment, the partial product array of the present invention generates numbers which are cyclical in nature, since each row is a repeat of the multiplicands, shifted one position with respect to each preceding row. Thus, each column is also cyclical in nature, i.e., the right-hand or the least-significant column contains the low-order position of the multiplicand at the top of the register. In the next or adjacent column to the left, the top register position contains the next higher order multiplicand bit, and immediately below it, the low-order bit of the multiplicand is stored in the next register position. The third column contains at the topmost position a binary bit from the third position from the right of the multiplicand, immediately below it and the register position contains the value of the second bit position of the multiplicand, and immediately below that the register contains the value of the low-order bit of the multiplicand, etc. Accordingly, each succeeding column contains all the information of the preceding column plus one more bit position. This characteristic allows the present invention to be modified so as to attain a significant reduction in the number of required register positions in the intermediate hardware case. The cyclical nature of the binary information generated in the partial product array allows an intermediate multi-operand adder hardware implementation.

In terms of mathematical relations, the following table illustrates the variations of structural design which can be employed to implement the present invention.

| | Number of shifts | Register columns | Hardware requirement | Speed |
|---|---|---|---|---|
| 1 | 0 | $m+n-1$ | Maximum | Minimum. |
| 2 | $k-1=[\log_2 (m-1)]-1$ | $p=\left\lvert \frac{m+n-1}{k} \right\rvert$ | Intermediate | Intermediate & variable. |
| 3 | $m+n-1$ | 1+multiplicand shift register. | Minimum | Maximum. |

For the intermediate case, the number of register columns of partial product array is $p$, where $m$ is the length of the multiplier in bits, $n$ is the length of multiplicand in bits, and $k$ is an integer greater than or equal to $\log_2(m-1)$.

At the one end of the spectrum, the maximum amount of hardware results in the fastest computation time. Implementation of case 1 of the table requires $m + n-1$ register columns with the outputs applied simultaneously to $m + n-1$ multi-operand adders.

A more optimal implementation requires $p$ register columns where the output signal generated from all the columns are simultaneously applied to the same number of multi-operand adders. However, in this implementation, some repetition is required since as the column information is being applied to the adder, addition is simultaneously taking place and each column is being shifted up one position. Thus, the top most bit value is lost and then added at the bottom of the column register to the value found in the $k^{th}$ position of a column immediately to the right. The resultant information in each column register now corresponds to that which would normally be found in the next adjacent column had the partial product array been implemented with $m + n-1$ register columns.

At the other extreme of the implementation, it is conceivable that the partial product array can be implemented with a single register column. However, instead of requiring only $k-1$ shifts to perform the complete multiplication, this implementation requires $m + n-1$ shifts. In this implementation, a shift into the bottom position of a register column supplies an appropriate multiplicand bit for the particular cycle or iteration of the multiplication process being performed. This extreme implementation requires minimum hardware, but on the other hand, would require an excessive amount of computation time.

Now referring to FIG. 1, it illustrates the long-hand process or procedure for the general case of multiplying an $n$-bit number by an $m$-bit number. Once the numerical partial product array is established, the product is obtained by numerical row summation in order to generate a final product. Accordingly, it can be seen that this type of multiplication scheme is ideally suited for implementation with adder circuitry which is capable of adding multiple operands. Numerous multiple operand adders exist for performing this addition, one such multiple operand adder is described in U.S. Pat. No. 3,675,001, issued July 4, 1972 and assigned to the same assignee as the present invention.

Figure 3:
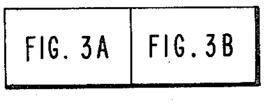
FIG. 3 is a block diagram illustrating the manner of interconnecting the electrical schematic diagrams illustrated in FIGS. 3A and 3B.
Figure 3A:
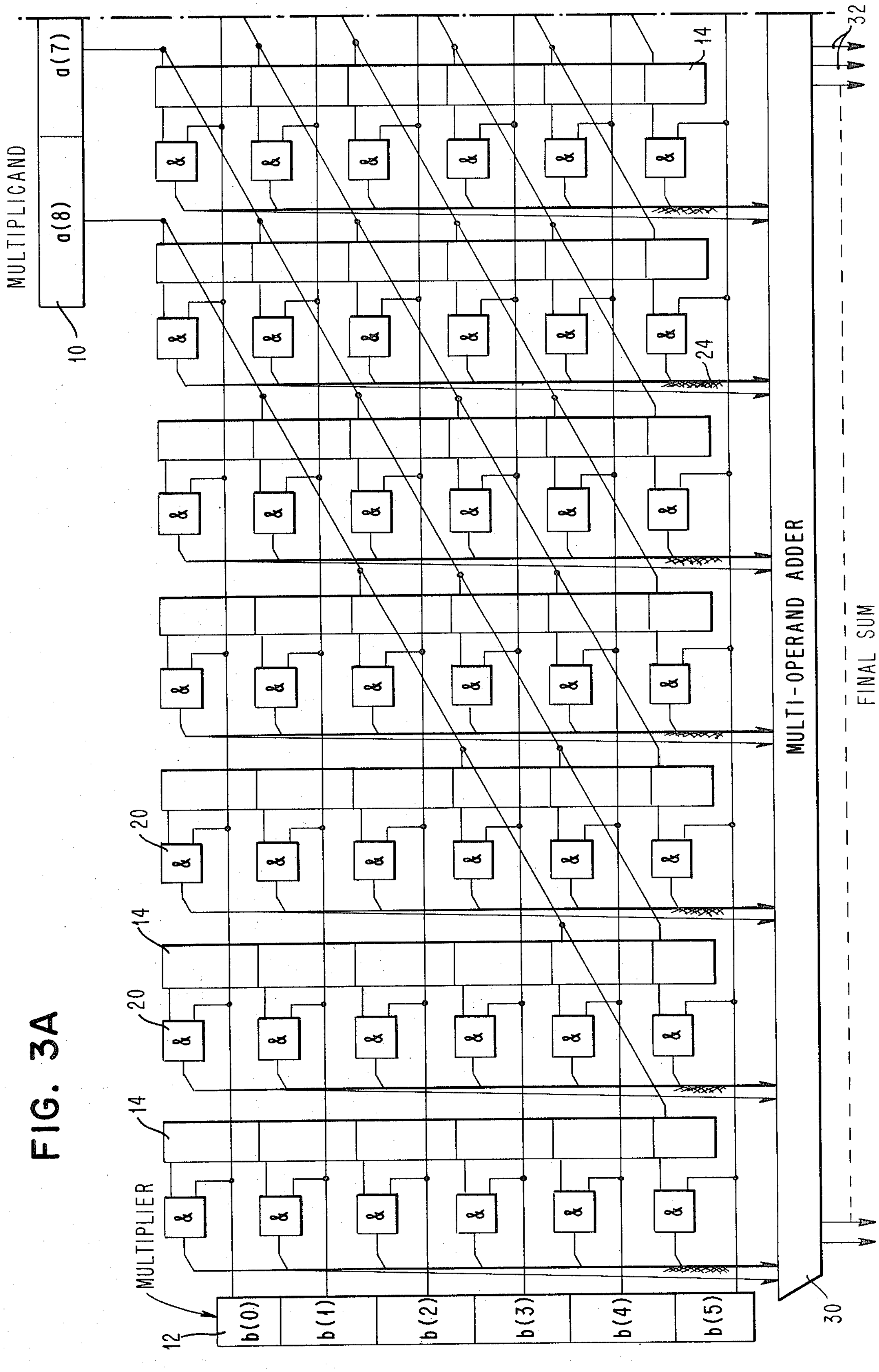
FIGS. 3A and 3B illustrate an electrical schematic diagram for implementing the present invention with $m + n - 1$ register columns; i.e., an identical number of columns as is required in the long-hand multiplication process counterpart.
Figure 3B:
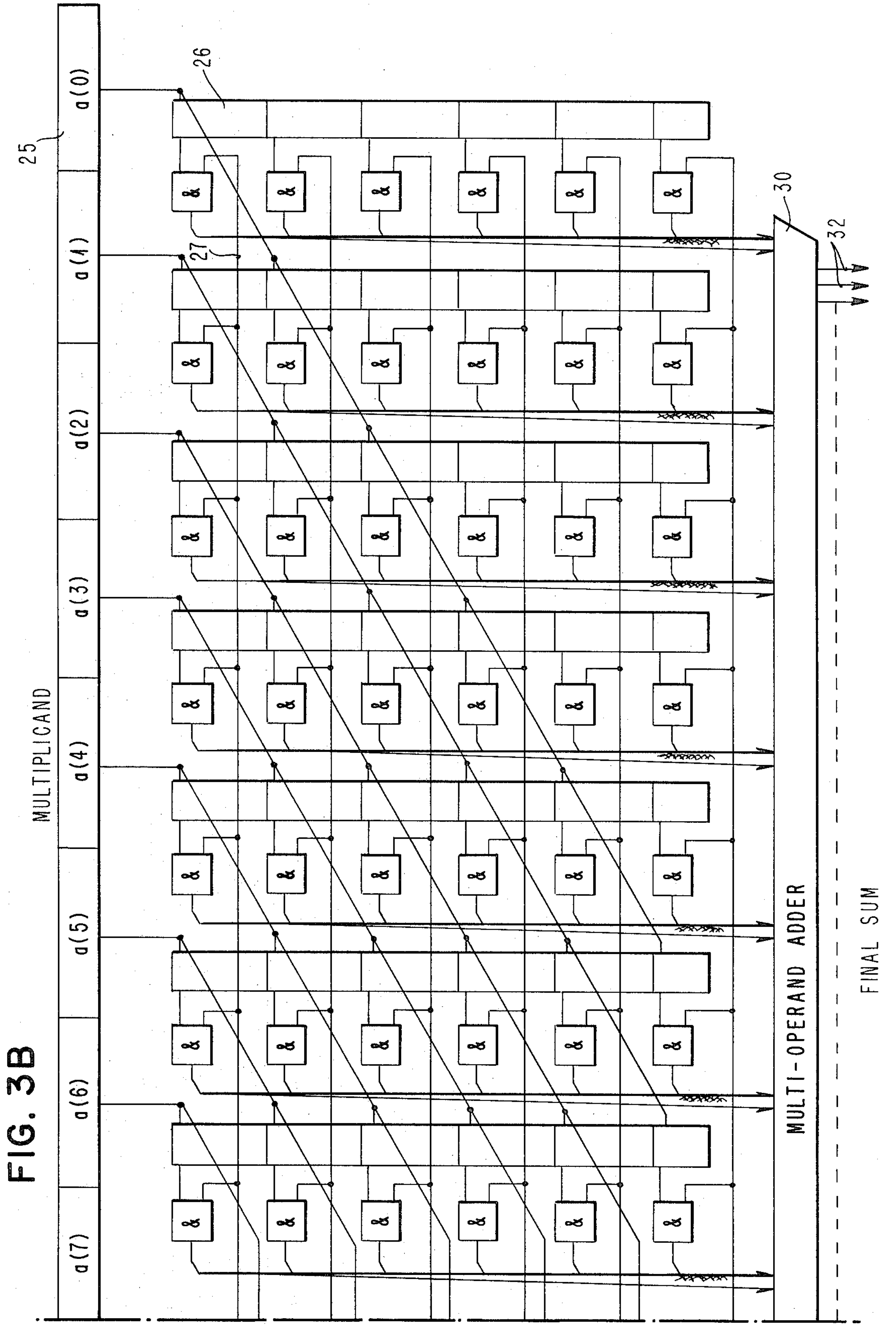

FIGS. 3A and 3B illustrate a schematic block diagram illustrating one manner of structurally implementing the present invention corresponding to the mathematical model given in FIG. 1.

A 9-bit multiplicand number $a(\mathbf{0}) \ldots a(\mathbf{8})$ is stored in a multiplicand register 10. A 6-bit multiplier number $b(\mathbf{0}) \ldots b(\mathbf{5})$ is stored in multiplier register 12.

The partial product array (PPA) comprises fourteen register columns and each register column comprises 6 storage positions each generally depicted at 14. Outputs $[a(\mathbf{0}) \ldots a(\mathbf{8})]$ from a multiplicand register 10 are applied to selected storage positions 10 as illustrated in FIGS. 3A, 3B. The outputs from selected storage positions 14 are gated through predetermined AND gates, generally designated at 20, as determined by gating signals received from the plurality of outputs from a multiplier register 12. The selective gating of AND gates 20 furnish the bit-by-bit multiplication of the multiplicand stored in register 10 by the multiplier number stored in the register 12.

If the multiplier bit is constituted by a binary 1, the corresponding multiplicand bits will be gated through its associated AND gate 20 and to an output line generally designated 24.

If the multiplier bit is constituted by a binary 0, then the result of the multiplication is represented by a plurality of binary 0's being gated to the associated output line 24, independent of whether the multiplicand bits are binary 0's or binary 1's. For example, if a multiplicand binary bit 0 stored in multiplicand register position 25 is applied to the top right-hand storage location 26 (FIG. 3B), and a binary 0 is applied on line 27 from the b(0) location in multiplier register 12, then a logical AND operation gates a binary 0 to its respective output line 24. The rest of the information is gated in a similar manner so as to supply the results via the plurality of output lines 24 to a multi-operand adder 30. The PPA hardware thus generates a plurality of signals which are summed in the adder 30 so as to generate a final product on the plurality of output lines 32.

Summarizing, the multiplicand and multiplier bit positions are placed in their appropriate registers 10 and 12, respectively. The multiplicand bits are then selectively loaded into their appropriate register locations 14. The contents of the register locations 14 are selectively gated via an associated AND gate 20 in accordance with the multiplier bits $[b(\mathrm{O})\ \mathrm{A} \ldots b(\mathbf{5})]$ stored in the multiplier register 12. A final product is obtained on output lines 32 from the multioperand adder 30.

Figure 2:
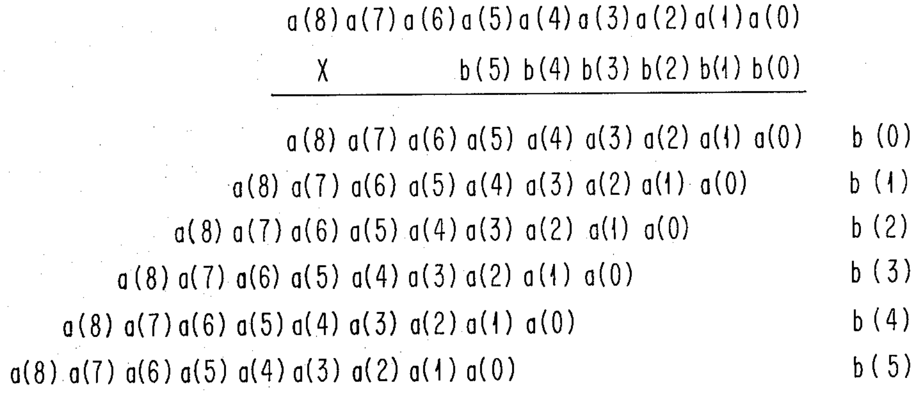
FIG. 2 mathematically illustrates the manner of arranging a partial product array in accordance with the present invention for specifically handling a 9-bit multiplicand and a 6-bit multiplier.
Figure 4:
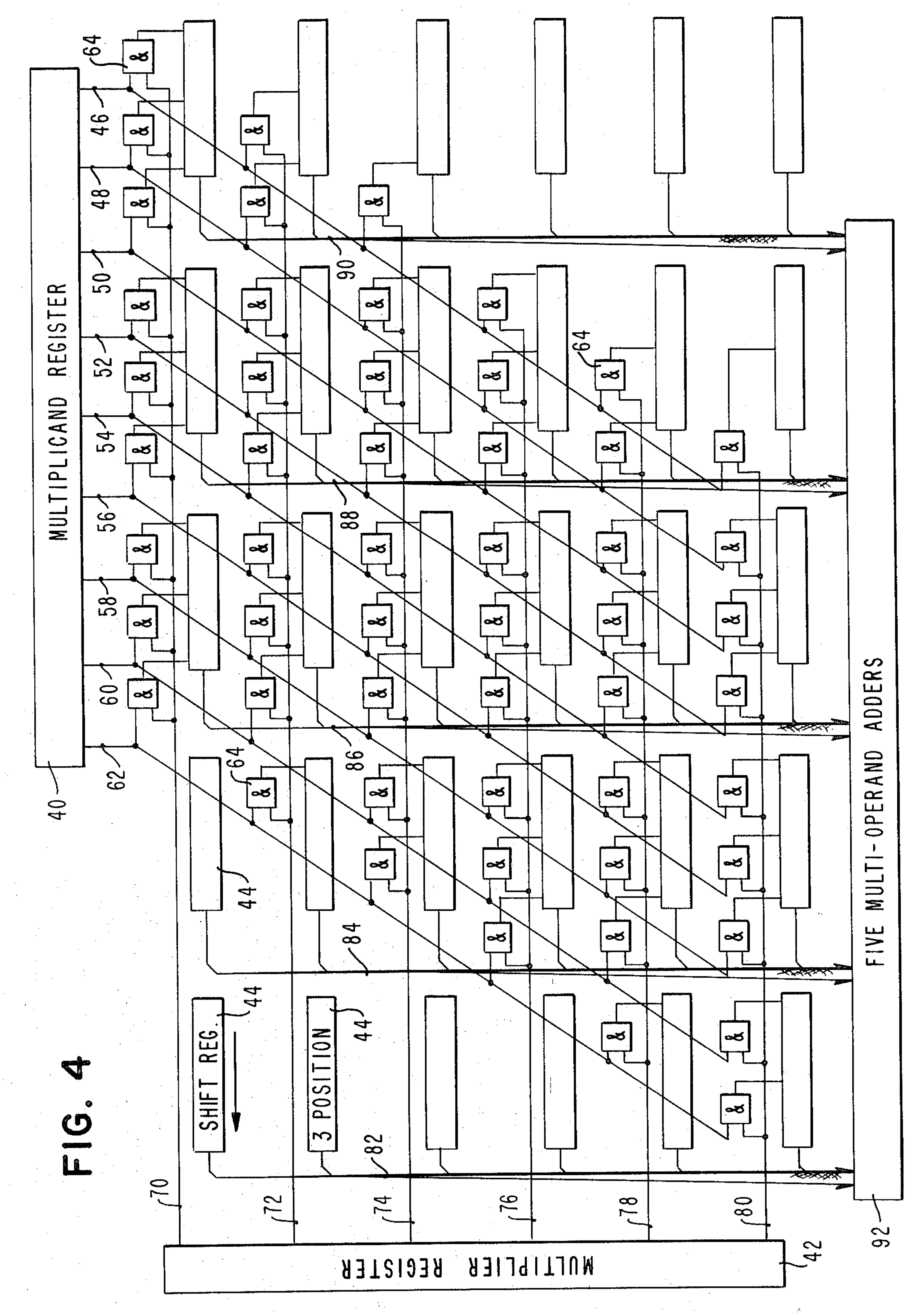
FIG. 4 is a schematic block diagram illustrating a complete partial product array requiring $p = (m + n)/(k)$ multi-operand adders, where $|(m + n-1)/(k)|$ is an integer $\geq m+n-1/k$.

Now referring to FIG. 2, it illustrates a mathematical model which explains the manner of implementing the PPA and multi-operand adder in accordance with the present invention in a manner which requires less hardware, as specifically illustrated in FIG. 4. The skewed nature of the long-hand multiplication process as illustrated in FIG. 2 allows the PPA to be arranged so that each cell comprises a three-bit shift register and an associated AND gate. This embodiment requires the same size partial product array previously described in FIG. 3A and 3B; however, only five multi-operand adders are required in order to obtain the final product or sum. In this instance, $m$ represents the number of bits in the multiplicand and is specifically illustrated as 9, and n designates the number of bits in the multiplier and corresponds to 6. Finally, $k$ is an interger greater than or equal to $\log_2(m-1)$, or in this specific example, $\log_2 8=3$. The number of required multi-operand adders is given by $p$, or 5 in this example.

A multiplicand register 40 stores a 9-bit, $a(\mathbf{0}) \ldots a(\mathbf{8})$ multiplicand and a multiplier register 42 stores a 6-bit, $b(\mathbf{0}) \ldots b(\mathbf{5})$ multiplier, as was specifically illustrated in the embodiment of FIG. 3. In this embodiment, the PPA rows are grouped into 3-bit partitions, that is, each row comprises five 3-bit shift registers generally designated at 44. The plurality of multiplicand bits from the multiplicand register 40 are applied via a plurality of output lines sequentially numbered starting at the low order position as 46, 48, 50, 52, 54, 56, 58, 60 and 62. These output lines supply input gating signals to predetermined AND gates generally indicated at 64. The other input to the plurality of AND gates 64 receives gating signals via the plurality of output lines 70, 72, 74, 76, 78 and 80 from the multiplier register 42, corresponding to the $[b(\mathbf{0}) \ldots b(\mathbf{5})]$ bits. The information stored in the extreme left-hand storage position for each of the plurality of registers 44 is applied via a plurality of lines 82, 84, 86, 88 and 90 to its associated one of five multi-operand adders generally indicated at 92.

The outputs generated on the plurality of output lines 82, 84, 86, 88 and 90 are applied to the multi-operand adders according to their numerical weight, thus, they are grouped in accordance with the vertical column from which the information is received, i.e., the most significant bits being applied beginning at the extreme left.

After the partial product array is selectively personalized or written into in accordance with the bit positions contained in the multiplier register 42 and the multiplicand register 40, the output information stored in the extreme left-hand column is shifted from its associated left-hand storage position and fed via line 82 to its associated multi-operand adder connected thereto.

The contents of each of the shift registers 44 in that column are then shifted one position to the left. Next, the outputs from the extreme left-hand storage position in each of the shift registers 44 situated in the second column from the left are then fed via line 84 to its associated multi-operand adder. The results applied via line 84 are then added to the results previously obtained from line 82.

In a similar manner, the contents in each of the shift registers 44 in the column to the right are shifted to the left another bit position and then the information stored in the extreme left-hand storage position from each of the registers 44 read out on its associated output lines 86, 88 and 90. These results are sequentially added to the results previously obtained.

Figure 5:
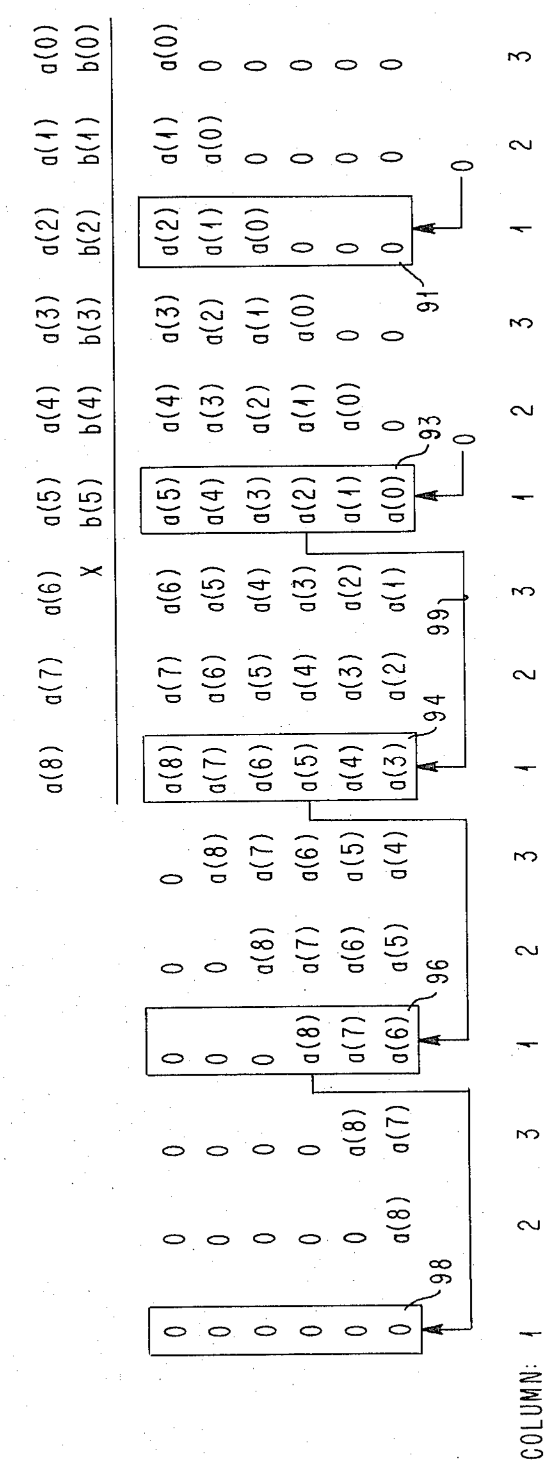
FIG. 5 is a partial schematic block diagram and mathematical representation illustrating the manner of implementing a partial product array requiring $p$ register columns.

Now referring to FIG. 5, it illustrates the cyclic nature of the partial product numerical array which is generated in the partial product array hardware of the present invention. As seen from FIG. 5, the mathematical model contains a complete numerical partial product array as a result of multiplying a 9-bit multiplicand by a 6-bit multiplier, mathematically designated as $[a(\mathbf{0}) \ldots a(\mathbf{8})]$ and $[b(\mathbf{0}) \ldots b(\mathbf{6})]$, respectively. Every third column as designated by the rectangles 91,

93, 94, 96 and 98 demonstrate the cyclic nature of the numbers generated in the array. Every second and third column in the five distinct groups (each labelled 1, 2, 3) is obtainable by selectively shifting a predetermined column 1 set of information up one position. For example, referring to the information stored in column 1 and designated by rectangle 94, it contains information ranging from a(8) in the uppermost storage position down to a(3) in its lowermost storage position. If the contents of the information stored in block 94 is shifted upwards, then the information in the uppermost storage location, $a(8)$, is allowed to overflow, and thus the $a(7)$ information is stored in the uppermost location, $a(6)$ is stored in the next to uppermost position, down to the information $a(3)$ being stored in the next to bottom position. The lowermost position is filled with information taken from the third from the bottom position of column 93 via line 99. Accordingly, the information in register or position 94 now contains the identical information to that contained in its adjacent column 2 of the same group, namely, $a(7) \ldots a(2)$. Similarly, the values for each of the number 3 columns in the distinct groups are obtainable from a column 1 position by another upward shift and transfer from the right.

The cyclic nature of the information generated in the partial product array allows a one-third hardware reduction to that previously described in the embodiments shown in FIGS. 3A, 3B and FIG. 4. This is possible because one register column may be utilized to produce, in time sequence, the information previously contained in three register columns. This implementation is mathematically designated by the relationship that the number of register columns necessary for an intermediate hardware implementation is $p$, or 5 in this specific example.

Figure 6:
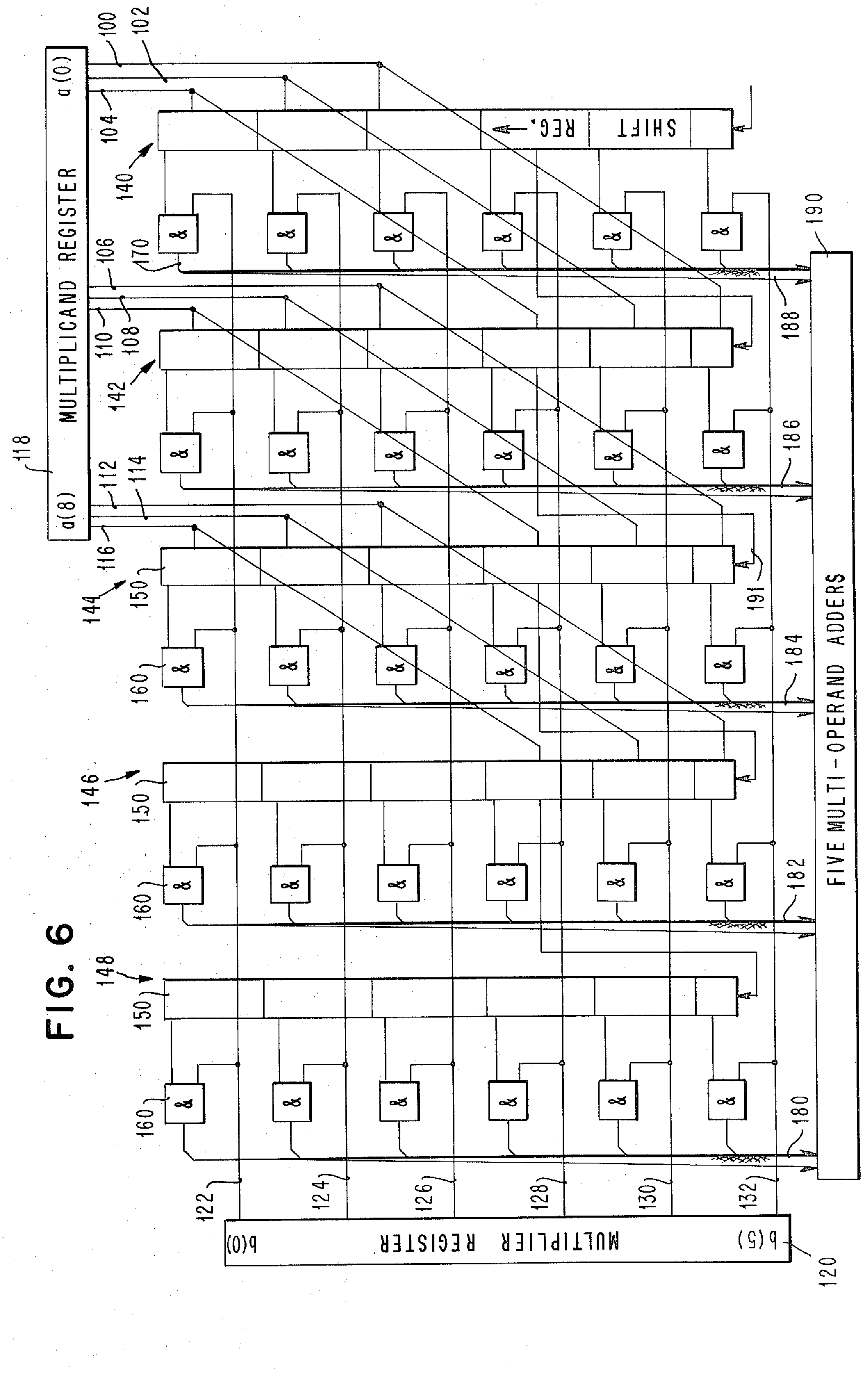
FIG. 6 is an electrical schematic block diagram illustrating in more detail the manner of implementing the partial product array principles illustrated in the partial block diagram and mathematical chart of FIG. 5.

FIG. 6 illustrates a hardware implementation in accordance with this principle. A multiplicand register 118 stores a multiplicand comprising bits $a(0) \ldots a(8)$ which are applied via the plurality of output lines 100, 102, 104, 106, 108, 110, 112, 114 and 116, respectively, corresponding to a sequential numbering beginning at the low order bit.

Similarly, a multiplier register 120 is adapted to receive the multiplier bits $b(0) \ldots b(5)$ and apply them to a plurality of output lines 122, 124, 126, 128, 130 and 132, respectively. Each of the five columns 140, 142, 144, 146 and 148 comprise a six-stage shift register, each storage location being generally designated at 150.

Each of the register positions 150 are adapted to supply a gating signal to an associated AND gate generally designated at 160. Another gating signal is applied to selective rows of AND gates 160 via its associated line (122 . . . 132) connected to the multiplier register 120.

The number generated at the output terminals from each of the respective AND gates 160 is the product of an associated multiplier and multiplicand bit position. For example, the product of the a(2) bit and the $b(0)$ bit is represented by the binary signal on output line 170 from the uppermost right-hand AND gate. The outputs from each of the AND gates 160 are selectively applied to an associated multi-operand adder via lines 180, 182, 184, 186 and 188.

Operationally, the partial product array of FIG. 6 in combination with five multi-operand adders generally depicted at 190 generate a final product in the following manner. The bit positions for the multiplicand and multiplier are loaded into their associated registers 118 and 120, respectively. Then, the information is selectively stored in the plurality of register positions designated 150. This information is then selectively gated to its respective AND gate 160 and applied to its associated multi-operand adder via lines 180, 182, 184, 186 and 188. The register columns 140, 142, etc. are shifted up one position and the bottom register position is fed from a third register position from the bottom of a register column immediately to the right; for example, via line 191. This alteration yields the least partial product array numerical values required for the attendant next addition cycle. Output lines 180 . . . 188 applied partial product results to the multi-operand adder 190 in order to initiate an addition operation with the previously stored partial product result. This sequence is performed a third cycle time so as to yield a final product for this multiplication operation. For purposes of clarity, the details of the logic circuitry necessary to selectively alter the partial product value information on adjacent columns is not shown, but again is illustrated in schematic form by line 191.

Figure 7:
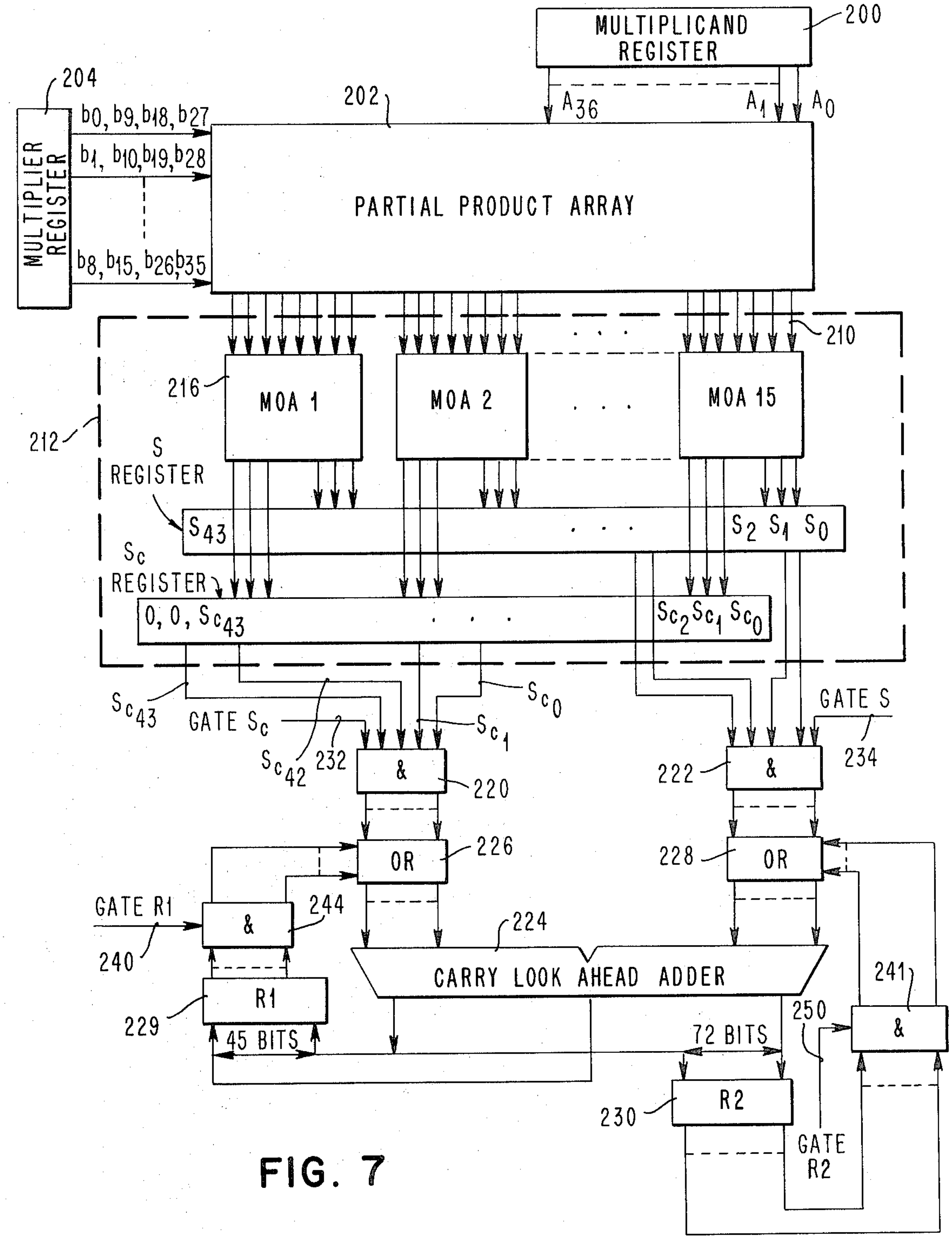
FIG. 7 illustrates a complete multiplier implementation utilizing the partial product array of FIG. 6 in combination with a multi-operand adder, specifically illustrated for a 36 × 36 bit multiplier.

Now referring to FIG. 7, it illustrates in greater detail a complete multiplication scheme including the partial product array means of the present invention in combination with a multi-operand adder. In the specific example, the multiplier is selected as having the capacity of multiplying 36 multiplicand bits by 36 multiplier bits, and comprises a multiplicand register 200 adapted to supply multiplicand bits $A_0 \ldots A_{36}$ to a partial product array means 202, and a multiplier register 204 adapted to supply a plurality of multiplier bits $b_0 \ldots b_{35}$ via a plurality of output lines to the partial product array means 202.

The partial product array means 202 can be implementable in accordance with any of the above previously mentioned embodiments. In the most generalized case, the partial product array means 202 would contain 36 rows and 71 register columns, if implemented according to the multiplier described in connection with FIGS. 3A and 3B. If implemented in accordance with the partial product array described in connection with FIG. 4, that is a partitioned partial product array, it would contain 9 rows and 44 register columns, and would require four cycles through the partial product array in order to apply all of the 36 bits of the multiplier, that is 9 bits at a time, in order to selectively gate with its associated multiplicand bits.

In the overall multiplier scheme described in detail in FIG. 7, the partial product array is implemented in accordance with the partial product array embodiment previously described in connection with FIG. 6. Thus, only 15 9-bit register columns and the appropriate AND gates are required in order to form the partial product array 202. The outputs generated from the partial product array 202 are applied via a plurality of output lines generally designated at 210 to a multi-operand adder 212. Again, the details of one such suitable multi-operand adder are described in U.S. Pat. No. 3,675,001. Generally, the adder 212 comprises fifteen multiple operand adders (MOA) generally designated 216 and a pair of registers comprising an S register and an $S_C$ register.

A pair of AND gates 220 and 224 are operative to gate the contents of the adder results stored in the S register and $S_C$ register into a final carry-look-ahead adder 224 via respective interconnected OR gates 226 and 228. A pair of registers 229 and 230 store partial results designated R1 and R2 received from the carry-look-ahead adder 224. In conjunction with a gating signal GATE R1 applied to line 240, the contents R1 of register 229 are gated through AND gate 244, OR gate 226, and back to the adder 224 for addition with serially received partial products generated from adder 212. Similarly, the contents R2 of register 230 are gated via AND gate 241, OR gate 228, and back to adder 224 upon the application of a gating signal GATE R2 on line 250. The final product of the overall multiplication process is contained in register 230.

For the particular example of a 36 × 36 bit multiplication, four passes through the partial product array 202 are required, which correspond to a 12-cycle operation since each pass requires three applications of inputs to the multi-operand adders generally designated at 216.

Specifically, the multiplier operates as follows:

1. The multiplicand low order and the 9 multiplier bits are entered into their respective registers 200 and 204.

2. The multiplicand is applied to the partial product array 202 in a parallel mode operation for all nine rows.

3. The S and $S_C$ registers of the adder 212 are filled after three cycles of operation of the multiplier.

a. On the first cycle, the bits in each column of the partial product array 202 are applied to their respective 9-bit multiple operand adders 216.

b. At the start of the second cycle, the register columns of the partial product array (not shown) are advanced up one position and fed from a right-hand adjacent register column, as previously described. At the conclusion of the second cycle, the 9 bits of each of the register columns are applied to their respective 9-bit adders 216.

c. The third cycle is a repeat of the second cycle.

4. The S and $S_C$ registers now contain a partial result. The contents of the S and $S_C$ registers are combined in the carry-look-ahead adder 224. The result is placed in the register 229. Then, the contents of register 229 is added to the contents of register 230 in the carry-look-ahead adder 244 with the most significant bit position contained in the register 230 being positioned as a ninth bit with respect to the least significant bit contained in the register 229. The contents stored in register 229 is left justified (adjusted so that the most significant bit is at the leftmost register position) as it is recycled to the adder 224 via AND gate 244 and OR gate 226. Then, the addition takes place in carry-look-ahead adder 224 and the results are placed in register R2 are left justified.

5. Then, in a parallel or overlap mode of operation, the operations of step 4 are repeated during a second pass through the partial product array 202. The multiplicand bits from the multiplicand register 200 remain the same, but during this pass, the second nine bits of the multiplier stored in register 204 are applied to the partial product array 202. This sequence basically comprises a repeat of steps 1, 2 and 3 in parallel with the previously described step 4.

6. All the steps of step 4 are again repeated during the second pass. 7. Steps 5, 6 are repeated and overlapped with step 6 for the third nine bits of the multiplier supplied from the multiplier register 204.

8. All the steps previously specified in step 4 are repeated for the third pass.

9. Step 7 is repeated and overlapped with step 8 for the fourth nine bits of the multiplier applied from the multiplier registers 204 to the partial product array 202.

10. Step 4 is completely repeated during the fourth pass.

11. The contents of register 230 now contain the final product.

If another multiplication is required, it can be overlapped with step 10. This results in a 12-cycle multiplication (12 passes through the plurality of multi-operand adders 216).

Although the invention has been particularly shown and described with reference to the preferred embodiments thereof, it will be understood by those skilled in the art that the foregoing and other changes in form and details may be made therein without departing from the spirit and scope of the invention.

What is claimed is:

1. A multiplier advantageously adaptable for implementation with large scale integrated circuits comprising:

a. a multiplicand storage means for storing $n$ multiplicand bits of data, and a multiplier storage means for storing $m$ multiplier bits of data, b. a partial product storage means for generating a partial product including no more than $m + n-1$ storage columns, said partial product storage means being connected to said multiplicand storage means in one coordinate direction associated with said partial product storage means, and also being connected to said multiplier storage means in the other coordinate direction associated with said partial product storage means, c. $p = | (m + n-1)/k |$ multi-operand adders connected to said storage array, where $k$ is an integer equal to or greater than $\log_2 (m-1)$, and where $| m + n-1/k |$ is an integer greater than or equal to $(m + n-1)/k$, d. said partial product storage means being selectively responsive to said $m$ and $n$ bits of data for generating a partial product, and e. said $p$ multi-operand adders being responsive to said generated partial product, independent of said $m$ and $n$ bits of data initially stored in said multiplier and multiplicand storage means, for generating a final product.

2. A multiplier advantageously adaptable for implementation with large scale integrated circuits as in claim 1 wherein said partial product storage means further includes:

a. a plurality of first gating means connected to said storage columns, each of said plurality of first gating means including a first input terminal, a second input terminal, and an output terminal, a plurality of said first terminals being connected to said multiplicand storage means and a plurality of said second terminals being connected to said multiplier storage means, and a plurality of said output terminals being connected to predetermined ones of said storage columns, and b. said plurality of first gating means being selectively responsive to said $m$ and $n$ bits of data for storing a partial product in said storage array.

3. A multiplier advantageously adaptable for implementation with large scale integrated circuits as in claim 1 wherein:

a. said partial product storage means is limited to $p$ storage columns, each one of said $p$ storage columns having a plurality of storage locations and being responsive to said $n$ multiplicand bits of data for storing an initial predetermined skewed pattern of said $n$ multiplicand bits of data, b. said partial product storage means further include means for interconnecting selected storage positions between said storage columns and being responsive to the transfer of data on said means for interconnecting for successively generating predetermined altered skewed patterns of data independent of said $n$ bits of data initially stored in said multiplicand storage means, and a plurality of gating means connected to predetermined storage positions and to said multiplier storage means, said plurality of gating means being responsive to said $m$ multiplier bits of data and serially responsive firstly to said initial predetermined skewed pattern of said $n$ multiplicand bits of data, and then to said predetermined altered skewed patterns of data independent of said $n$ bits of data initially stored in said multiplicand storage means, for generating a plurality of reduced partial product patterns of data, and c. said $p$ multi-operand adders being selectively responsive only to said reduced partial product patterns of data, independent of said $m$ and $n$ bits of data initially stored in said multiplier and multiplicand storage means, for generating a final product.

4. A multiplier advantageously adaptable for implementation with large scale integrated circuits as in Claim 3 wherein:

a. said storage positions comprise a plurality of shift register locations distributed among said $p$ storage columns, and b. said means for interconnecting selected storage positions further comprise shifting means connected between predetermined ones of said shift register locations for selectively transferring data between said $p$ storage columns for generating said predetermined altered skewed patterns of data from said initial predetermined skewed pattern of data.

* * * * *